(12) United States Patent
Legendre et al.

(10) Patent No.: US 7,656,160 B2
(45) Date of Patent: Feb. 2, 2010

(54) DETERMINING PROPERTIES OF EARTH FORMATIONS USING THE ELECTROMAGNETIC COUPLING TENSOR

(75) Inventors: Emmanuel Legendre, Houston, TX (US); Jean Seydoux, Sugar Land, TX (US); Reza Taherian, Sugar Land, TX (US); Jian Yang, Sugar Land, TX (US); Qiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 483 days.

(21) Appl. No.: 11/610,653

(22) Filed: Dec. 14, 2006

(65) Prior Publication Data

US 2008/0143336 A1 Jun. 19, 2008

(51) Int. Cl.
*G01V 3/18* (2006.01)
(52) U.S. Cl. ................................ 324/339; 324/343
(58) Field of Classification Search ......... 324/333–334, 324/337–340, 343, 346, 351–352, 354–359, 324/366; 702/6–9, 11; 175/45, 61–62
See application file for complete search history.

(56) References Cited

U.S. PATENT DOCUMENTS

| | | | |
|---|---|---|---|
| 4,968,940 A | | 11/1990 | Clark et al. |
| 5,345,179 A | | 9/1994 | Habashy et al. |
| 5,508,616 A | * | 4/1996 | Sato et al. ................ 324/343 |
| 6,476,609 B1 | * | 11/2002 | Bittar ......................... 324/338 |
| 7,091,877 B2 | | 8/2006 | Barber et al. |
| 7,268,556 B2 | | 9/2007 | Fanini et al. |
| 2004/0113609 A1 | | 6/2004 | Homan et al. |

FOREIGN PATENT DOCUMENTS

| | | |
|---|---|---|
| RU | 2069878 | 11/1996 |
| RU | 2107313 | 3/1998 |
| SU | 960701 | 4/1981 |
| SU | 998995 | 2/1983 |

OTHER PUBLICATIONS

VF Machetin, et al., "TEMP-a New Dual-Electromagnetic and Laterolog Apparatus-Technological Complex," 13th European Formation Evaluation Symposium Transactions, Budapest Chapter, SPWLA, Paper K (1990).
VA Korolev et al., "Electromagnetic Logging by a Lateral Magnetic Dipole. Perspectives of Electromagnetic Well Scanning," Geofizika Scientific-Production Company, Russia (1995).
"Double Electromagnetic and Lateral Logging," Methodical Handbook, Moscow, Nedra, Russian (1991).

* cited by examiner

*Primary Examiner*—Bot L LeDynh
(74) *Attorney, Agent, or Firm*—Darla Fonseca; Brigitte Echols; Dale Gaudier

(57) ABSTRACT

A system and method to determine earth formation properties by positioning a logging tool within a wellbore in the earth formation, the logging tool having a tool rotation axis and a first, a second, and a third tilted transmitter coil, and a tilted receiver coil; rotating the logging tool about the tool rotation axis; energizing each transmitter coil; measuring a coupling signal between each transmitter coil and the receiver coil for a plurality of angles of rotation; determining a coupling tensor; and determining the earth formation properties using the coupling tensor.

27 Claims, 3 Drawing Sheets

DETERMINING PROPERTIES OF EARTH FORMATIONS USING THE ELECTROMAGNETIC COUPLING TENSOR

FIELD OF THE INVENTION

The present invention relates to well logging and, more particularly, to determining earth formation properties using the entire electromagnetic coupling tensor of an earth formation in a gain-corrected manner.

BACKGROUND

In petroleum exploration and development, formation evaluation is used to determine whether a potential oil or gas field is commercially viable. One factor to determining the commercial viability of a potential field is the resistivity of the earth formation. The resistance to electric current of the total formation—rock and fluids—around the borehole is the sum of the volumetric proportions of mineral grains and conductive water-filled pore space. If the pores are partially filled with gas or oil, which are resistant to the passage of electrical current, the bulk formation resistance is higher than for water-filled pores.

Conventional induction logging tools use multiple coils to measure the conductivity (i.e., the inverse of resistivity) of the formation. However, formation conductivity is not a single number because the formations are invariably anisotropic, i.e., directionally dependent, which causes the conductivity to be a tensor quantity. As a result the more recent induction tools have been designed with multiple transmitter or receiver coils whose magnetic moments are in multiple directions and measurements between these coils are sensitive to more than one component of the conductivity (or more generally, impedance) tensor.

For instance, in 3D array induction imager wireline tools (e.g., 3D-AIT™), both transmitter and receiver coils have magnetic dipole moments in the x, y, and z directions, with z defined as along the axis of the tool. This is an improvement of conventional induction tool design, where only z-directed coils are employed. As an example, energizing the transmitter coil (T coil) in the x-direction and measuring with a receiver coil (R coil) that is in the y-direction provides the xy-component of the coupling tensor in the tool frame of reference. Other combinations of the transmitter and receiver coils can provide remaining components of the coupling tensor and characterize the formation.

Similarly, LWD (logging-while-drilling) tools may be designed with receiver antennas having magnetic dipole moments tilted relative to the z-direction and transmitter antennas having magnetic dipole moments parallel to the z-direction. The tilted receivers may be, for example, in the z- and x-directions and provide measurements that are a linear combination of those two signals. As the LWD tool rotates during normal drilling operations, the tilted receivers sample formation properties in multiple directions and can provide many, but not all, of the components of the coupling tensor. As the tool penetrates the earth, other earth layers come within the depth of investigation of these measurements and the distance to these boundaries can be extracted from the measurements and used for geosteering purposes.

An inherent difficulty in using these tools is that the coil efficiency, and electronic drift affects the coupling between T and R coils. Thus, the T-R signal is not just a function of the medium filling the space between the T and R antennas, and needs to be corrected for coil sensitivity and drift. With current designs, for example, there are no extra measurements available to enable one to estimate these couplings (e.g., gains) and one must assume that the gains remain constant and uphole measurements (e.g., calibrations) can be used to correct for them.

In logging, the borehole compensation (BHC) technique provides a method of self-calibrating electromagnetic measurements. BHC consists of placing two outer sensors symmetrically on the two sides of the center sensors. For four coils, made of two transmitters and two receivers, the coil arrangements along the tool axis are either T1-R1-R2-T2 or R1-T1-T2-R2. By taking appropriate ratios of four basic and un-calibrated measurements, one can create a quantity that is independent of coil gains. The method is based on taking two ratios leading to Equation (P1) below:

$$\frac{(T1)(R1)S_{11}}{(T2)(R1)S_{21}} * \frac{(T2)(R2)S_{22}}{(T1)(R2)S_{12}} \qquad (EQ.\ P1)$$

where the antenna efficiencies are shown in parentheses and $S_{ij}$ represents the desired signal received from transmitter i by receiver j.

As can be seen, R1 is common in the first fraction and the gain of R1 receiver cancels in taking the first ratio, the gain of R2 cancels taking the second ratio, and when the two ratios are multiplied together, the gain of T1 and T2 cancels. The net result is a ratio measurement that, if expressed in logarithmic form, leads to an amplitude ratio and a phase shift, both of which are gain corrected. In this example, because the coils or sensors are aligned with the z-axis, only the zz-component of the measurement tensor is determined. This method works well when the antennas are arranged symmetrically as in CDR™ (Compensated Dual Resistivity) and EPT™ (Electromagnetic Propagation Tool) devices.

For logging tools attempting to characterize the whole coupling tensor, the sign (or phase for complex quantities) of off-diagonal terms is very important as it is used for log interpretation purposes. The BHC method works by taking ratios of the measurements, which introduces sign ambiguity. Examples include the ratio of two negative terms and a negative ratio in which it is not clear which term had a negative sign originally. For LWD tools with receiver coils that are tilted relative to the z-direction, the tool rotation may be used to generate gain-corrected signal ratios. This technique partially solves the problem, but limits the measurements to simple ratios of electromagnetic coupling tensor elements.

Therefore, it is a desire to provide a method of measuring the entire coupling tensor, which is the preferred way of inferring earth conductivity anisotropy and the distance to boundaries separating media of different conductivities. It is a further desire to make these measurements in a gain-corrected fashion with minimum requirements on the hardware. The present invention proposes a solution to characterize both the coupling tensor and the gain corrections.

SUMMARY OF THE INVENTION

The invention comprises a system and method to determine earth formation properties by positioning a logging tool within a wellbore in the earth formation, the logging tool having a tool rotation axis and a first, a second, and a third tilted transmitter coil, and a tilted receiver coil; rotating the logging tool about the tool rotation axis; energizing each transmitter coil; measuring a coupling signal between each transmitter coil and the receiver coil for a plurality of angles of rotation; determining a coupling tensor; and determining the earth formation properties using the coupling tensor.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of specific embodiments of the invention, when read in conjunction with the accompanying drawings, wherein.

DETAILED DESCRIPTION

Figure 1:
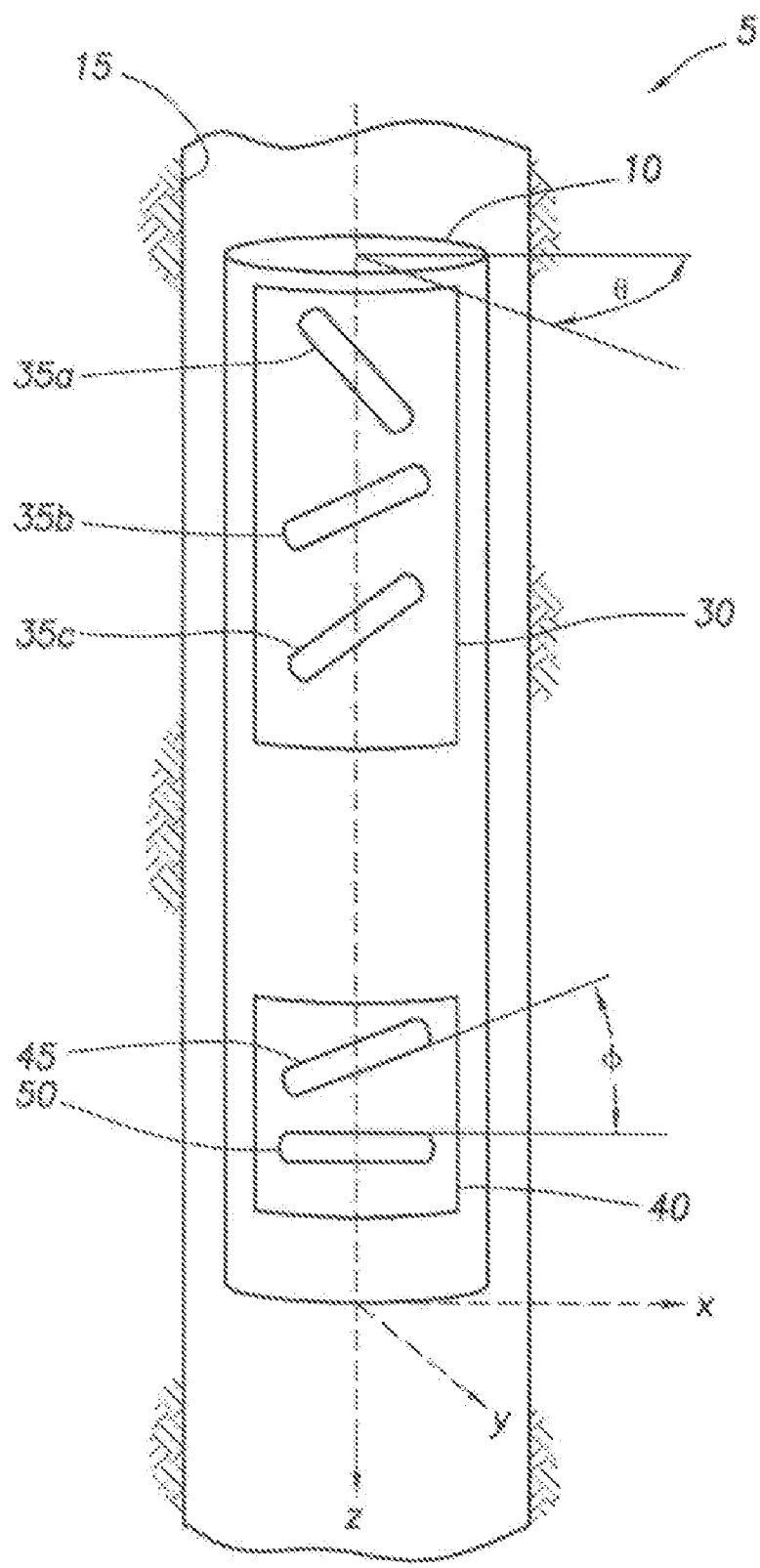
FIG. 1 is a schematic drawing of a logging tool of the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point. In addition, the terms "coil" and "antenna" may be used interchangeably herein in both the description and the claims.

FIG. 1 is a schematic drawing of a logging system of the present invention, generally denoted by 5. Tool 10 may be lowered into borehole 15 that has been created in earth formation 20. Tool 10 may be any tool suitable for measuring the resistivity (or conductivity) of formation 20, among other factors relevant to the field of oil field logging. In addition to electrical characteristics of the formation, tool 10 may be able to collect measurements concerning other formation parameters, such as NMR (nuclear magnetic resonance) data, for example.

Tool 10 includes subs 30 and 40. Sub 30 includes at least three antennas 35(a)-(c), placed in proximity to each other. Antennas 35 may be any type of antenna suitable for a logging tool, including high resolution antennas or multi-frequency antennas. Antennas 35 may each operate at one or more frequencies that correspond to one or more diameters or depths of investigation (DOI). Antennas 35 are "tilted", meaning they have magnetic dipole moments having non-zero components along the z-axis, i.e., the tool rotation axis, but not entirely aligned with the z-axis. They can be azimuthally rotated relative to one another and may have different tilt angles. Each antenna must be linearly independent of the others.

Sub 40 contains at least one antenna 45. The spacing between sub 30 and sub 40 may be selected to achieve optimal results depending on the application. Antenna 45 may be any antenna suitable for a logging tool, including high resolution antennas or multi-frequency antennas. Antenna 45 may operate at one or more frequencies that correspond to one or more diameters or depths of investigation (DOI). Antenna 45 is a tilted (as defined above) coil antenna and is tilted from the tool rotation axis by Φ degrees, where Φ is non-zero. The spacing and tilt of receiver 45 may be selected to achieve optimal results depending on the application.

By reciprocity, sub 30 may operate as either a transmitter or receiver sub in opposition to the operation of sub 40. In one embodiment, sub 30 operates as the transmitter sub, and sub 40 acts as the receiver sub. Accordingly, antennas 35a, 35b, and 35c operate as transmitters (alternatively referred to herein as "T1", "T2" and "T3", respectively) and antenna 45 operates as a receiver (alternatively referred to herein as "R1").

In addition to subs 30 and 40, tool 10 may contain a power supply, control and telemetry circuits, computer processors (or similar circuitry for analysis of data and measurements), and other components suitable for an electromagnetic resistivity logging tool. These components may be incorporated in tool 10 or located uphole in devices or facilities on the surface.

The conductivity of a medium may be determined from an analysis of the electromagnetic coupling tensor. We begin the analysis by considering the coupling between a transmitter and receiver in some medium. If the transmitter and receiver are both coil antennas, each can be approximated as a magnetic dipole having a magnetic moment that represents the efficiency and orientation of the antenna. The transmitters can be operated one at a time or, if slightly different frequencies are used such that the signals can be discriminated, yet are close enough in frequency to be considered a single frequency, the transmitters can be operated simultaneously.

The voltage induced or the coupling signal at receiver coil 45, $V_{TR}$, as a result of a current flowing in a transmitter coil, e.g., coil 35a, 35b or 35c, is given by a tensor equation, shown as Equation (1):

$$V_{TR} = \bar{m}_T{}^t \cdot \bar{\bar{Z}} \cdot \bar{m}_R \tag{EQ. 1}$$

where Z is the coupling tensor characterizing the medium between the transmitter and receiver coils and is given by Equation (2), $$\bar{\bar{Z}} = \begin{pmatrix} (xx) & (xy) & (xz) \\ (yx) & (yy) & (yz) \\ (zx) & (zy) & (zz) \end{pmatrix} \tag{EQ. 2}$$

The coupling tensor can be used to determine earth formation properties such as the conductivity tensor.

The components of the tensor are expressed as (ij), representing the elementary coupling between a transmitter and a receiver, where the transmitter is oriented along the i-direction, and the receiver is oriented along the j-direction of a Cartesian coordinate system. In general, all quantities are complex numbers and the transpose of the matrix is the trans-conjugate of the matrix. The vectors $m_T$ and $m_R$ represent the magnetic moments of the transmitter and receiver coils, respectively.

The coordinate systems used herein are Cartesian coordinate systems (orthogonal and unitary basis vectors) in which the z-axis is aligned with the tool axis. Quantities identified with a double bar are matrices or tensors, and quantities identified with a single bar are vectors.

When Equation (1) is applied to conventional induction tools, such as an array induction tool, then vectors $m_R$ and $m_T$ have only a z-component, and the (zz) component of the coupling tensor is determined. If the receiver is tilted such that the components of the magnetic moment are along the z- and x-directions while the transmitter magnetic moment is along the z, then the measurement result is a linear combination of (zx) and (zz), weighted by the relative orientation of the receiver antenna.

While Equation (1) is independent of coordinate system, one must commit to a particular coordinate system in which to do the computations prior to performing the computations. Using multiple coordinate systems simplifies the expression of various quantities, but requires coordinate transformations be performed to express all quantities in a common system before performing the actual computations. For example, the magnetic moments can be easily expressed as constant vectors in a rotating coordinate system, but it is more convenient to use the coupling tensor expressed in a fixed system. Thus, the magnetic moments must be transformed from the rotating system to the fixed one if the computations are done in the fixed frame. If F is the matrix transforming a vector from the rotating frame to the fixed frame, one can obtain the transformations shown in Equations (3a-c):

$$\overline{m}_T \rightarrow \overline{F} \cdot \overline{m}_T \qquad (EQ.\ 3a)$$

$$\overline{m}_R \rightarrow \overline{F} \cdot \overline{m}_R \qquad (EQ.\ 3b)$$

$$\overline{Z} \rightarrow \overline{Z} \qquad (EQ.\ 3c)$$

This coordinate transformation is required, for example, to account for the rotation of tool 10 during drilling. At some time, t, tool 10 is rotated around the tool axis (defined as the z-axis) by an angle $\theta$ relative to the fixed reference frame (the fixed frame being initially aligned with the rotating frame, but with its x-axis fixed relative to the "top of hole" or magnetic north, for example). Here the rotation is clockwise as viewed from above. In this case the transforming matrix F is in fact a rotation matrix, R, discussed below. For the purposes of the present disclosure, the rotating coordinate system shall be referred to as the "tool coordinate system".

The transformation matrix from the tool coordinate system to the fixed system as described above is given by:

$$\overline{R}(\theta) = \begin{pmatrix} \cos(\theta) & -\sin(\theta) & 0 \\ \sin(\theta) & \cos(\theta) & 0 \\ 0 & 0 & 1 \end{pmatrix} \qquad (EQ.\ 4)$$

The voltage at the receiver will become a function of the angle $\theta$, even though the coupling tensor does not change.

Introducing Equation (4) into Equation (1) leads to:

$$V_{TR}(\theta) = (\overline{R}(\theta) \cdot \overline{m}_T)^t \cdot \overline{Z} \cdot (\overline{R}(\theta) \overline{m}_R) \qquad (EQ.\ 5a)$$

$$V_{TR}(\theta) = \overline{m}_T^t \overline{R}(\theta)^t \cdot \overline{Z} \cdot \overline{R}(\theta) \overline{m}_R \qquad (EQ.\ 5b)$$

$$V_{TR}(\theta) = \overline{m}_T^t \cdot \overline{M}(\theta) \cdot \overline{m}_R \qquad (EQ.\ 5c)$$

Wherein, $$\overline{M}(\theta) = \overline{R}(\theta)^t \cdot \overline{Z} \cdot \overline{R}(\theta) \qquad (EQ.\ 5d)$$

with:

$$\overline{M}(\theta) = \begin{bmatrix} \frac{(xx)+(yy)}{2} + \frac{(xy)+(yx)}{2}\sin(2\theta) + \frac{(xx)-(yy)}{2}\cos(2\theta) & \cdots & \frac{(xy)-(yx)}{2} + \frac{(yy)-(xx)}{2}\sin(2\theta) + \frac{(xy)-(yx)}{2}\cos(2\theta) & (xz)\cos(\theta) + (yz)\sin(\theta) \\ \frac{(yx)+(xy)}{2} + \frac{(yy)+(xx)}{2}\sin(2\theta) + \frac{(xy)-(yx)}{2}\cos(2\theta) & \cdots & \frac{(xx)+(yy)}{2} - \frac{(xy)+(yx)}{2}\sin(2\theta) - \frac{(xx)-(yy)}{2}\cos(2\theta) & (yz)\cos(\theta) - (xz)\sin(\theta) \\ (zx)\cos(\theta) + (zy)\sin(\theta) & \cdots & (zy)\cos(\theta) - (zx)\sin(\theta) & (zz) \end{bmatrix} \qquad (EQ.\ 6)$$

As shown in Equation (6), any component of the $M(\theta)$ matrix can be represented as the sum of five possible terms, namely a constant term, a $\sin(\theta)$ term, a $\cos(\theta)$ term, a $\sin(2\theta)$ term, and a $\cos(2\theta)$ term. The origin of these trigonometric terms is Equation (4) and its multiplication in Equation (5d), but these terms constitute the components of the Fourier expansion of $V_{TR}(\theta)$. The coefficients can be extracted if $V_{TR}(\theta)$ is measured for at least five different angles, however there are nine components in the Z matrix and the system is under determined.

Typically, instruments like AIT™ tools have all magnetic dipoles aligned with the z-axis and accordingly measure a single complex quantity proportional to (zz), independent of $\theta$. Recently developed LWD tools contain receiver coils that are not aligned with the tool axis. Using the above method, these LWD tools may measure some, but not all, of the components of the coupling tensor. With the implementation of these LWD tools, a limited number of gain-corrected elementary couplings are obtained.

The system and method of the present invention, however, obtains all components of the coupling tensor in a gain-corrected fashion and with a minimum number of coils. The Fourier components in Equation (6) are weighted by the linear combination of the desired elementary couplings, namely (xy), (xx), etc. Finding those elementary couplings is a linear problem.

Equation (6) may be expressed in a different form, as described below. The xx-component of the $M(\theta)$ matrix is given by:

$$\overline{M}(\theta)_{xx} = \frac{(xx)+(yy)}{2} + \frac{(xy)+(yx)}{2}\sin(2\theta) + \frac{(xx)-(yy)}{2}\cos(2\theta). \qquad (EQ.\ 8)$$

Equation (8) contains three types of quantities: some elementary couplings ((xx), (yy), (xy) and (yx)), some basis functions ($\sin(2\theta)$ and $\cos(2\theta)$), and some constant coefficients. (+½ and −½). Because the final objective is to determine the values of the elementary couplings, it is advantageous to separate the three sets of quantities into a vector of basis functions, F, a matrix of coefficients, M, and a vector of elementary couplings, P such that $M(\theta)_{xx}$ can be expressed as shown in Equation (9):

$$\overline{\overline{M}}(\theta)_{xx} = \overline{F} \cdot \overline{\overline{M}} \cdot \overline{P}. \tag{EQ. 9}$$

where, F and P are defined as:

$$\overline{F} = [1, \sin(\theta), \cos(\theta), \sin(2\theta), \cos(2\theta)]; \tag{EQ. 10}$$

$$\overline{P}^t = [(xx), (yy), (zz), (xy), (xz), (yz), (yx), (zx), (zy)]; \text{ and} \tag{EQ. 11}$$

M for the xx component is:

$$\overline{\overline{M}}_{xx} = 1/2 * \begin{bmatrix} 1 & 1 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 1 & 0 & 0 & 1 & 0 & 0 \\ 1 & -1 & 0 & 0 & 0 & 0 & 0 & 0 & 0 \end{bmatrix}. \tag{EQ. 12}$$

For the same transmitter-receiver antenna combination, M is always the same, independent of the rotational angle or the properties of the medium, and depends only on the orientation of the antennas. F changes as a function of angle θ but is independent of the medium. Lastly, P varies as the measurements are done in different media.

Before introducing Equation (9) into Equation (5), the magnetic moments of transmitter and receiver antennas, coils 35a, 35b, 35c and 40, must be determined. These antennas may, in general, have three components along the Cartesian coordinate system:

$$\overline{m}_T = \begin{pmatrix} \alpha_1 \\ \alpha_2 \\ \alpha_3 \end{pmatrix}; \tag{EQ. 13}$$

and $$\overline{m}_R = \begin{pmatrix} \beta_1 \\ \beta_2 \\ \beta_3 \end{pmatrix}. \tag{EQ. 14}$$

where the components contain the magnetic moment and the direction information.

Substituting Equations (9), (13), and (14) into Equation (5) leads to Equation (15):

$$V_{TR}(\theta) = \sum_{i,j} \alpha_i \beta_j \overline{\overline{M}}(\theta)_{ij}; \tag{EQ. 15a}$$

or $$V_{TR}(\theta) = \sum_{i,j} \alpha_i \beta_j \overline{F} \cdot \overline{\overline{M}}_{ij} \cdot \overline{P} \tag{EQ. 15b}$$

$$V_{TR}(\theta) = \overline{F}(\theta) \cdot \left( \sum_{i,j} \alpha_i \beta_j \overline{\overline{M}}_{ij} \right) \cdot \overline{P} \tag{EQ. 15c}$$

For the summation term in Equation (15), assuming that the gains of the transmitter and receiver antennas are known, all the terms in the sum are known and are constant. Further, as shown in Equation (12), the sum is over matrices of (5×9) dimensions with appropriate weighting coefficients, leading to a (5×9) final matrix, C, shown in Equation (16). Note matrix C depends only on coil orientation, i.e., tool layout.

$$\overline{\overline{C}} = \sum_{i,j} \alpha_i \beta_j \overline{\overline{M}}_{ij}; \text{ and} \tag{EQ. 16}$$

$$V_{TR}(\theta) = \overline{F}(\theta) \cdot \overline{\overline{C}} \cdot \overline{P}. \tag{EQ. 17}$$

As noted above, for the same transmitter-receiver pair, the measurements have to be done at a minimum of five angles. If Equation (17) is repeated for k different angles (where k>=5), and the resulting equations are cast into matrix form, as shown in Equation (18), the measured voltages turn into a k-dimensional vector and the F vector becomes a (k×5) matrix. The values for C and P remain unchanged.

$$\overline{V}_{TR}(\theta) = \overline{\overline{F}}(\theta) \cdot \overline{\overline{C}} \cdot \overline{P} \tag{EQ. 18}$$

Although $V_{TR}$ is a (k×1)-dimensional vector, the number of independent equations is determined by the rank of the matrix relation on the right hand side, which is only five. Thus, with measurements using one transmitter and one receiver antenna, one can get a maximum of five independent coupling components, which is not enough to characterize the coupling tensor (or the P vector).

In order to determine all components of the P vector, more than one T-R combination is needed. Two different transmitter-receiver combinations, such as $T_1R_1$ and $T_2R_1$, for example, is also insufficient. With two transmitter-receiver combinations, the rank of the combined matrix is, at most, equal to 8, which also does not provide enough measurements to characterize P.

Three transmitter-receiver combinations is sufficient, however. Because tool 10 contains three different transmitters co-located, or placed in proximity with one other, and having a non-zero projection along the z-axis (e.g., coils 35), and the receiver (e.g., coil 45) is not aligned solely with the z-axis, the combined matrix has a rank of 9:

$$\text{rank}([\overline{F}_{T1,R} \cdot \overline{\overline{C}}_{T1,R} \cdot \overline{P}); (\overline{F}_{T2,R} \cdot \overline{\overline{C}}_{T2,R} \cdot \overline{P}); (\overline{F}_{T3,R} \cdot \overline{\overline{C}}_{T3,R} \cdot \overline{P})]) = 9 = \text{length}(p) \tag{EQ. 19}$$

where the notation on the left hand side is to show the three vectors are concatenated.

Accordingly, with the configuration described above, it is possible to map the measured voltages to all components of P. Any reciprocal measurement (e.g., swapping the role of transmitter and receiver) will give equivalent properties, thus the transmitters and receivers can be operated in a reciprocal manner. It is possible to have similar results with more coils, but it is preferable to minimize the number of required coils in the system.

Gain is a complex multiplicative quantity, representing imperfections in coil manufacturing, and phase shift due to imperfect electronics, among other factors. In one embodiment, a gain-corrected coupling tensor is obtained by assessing the relative gains between the transmitter and receiver coils to provide accurate measurements.

We can describe the raw measurements of $V_{TR}(\theta)$, the relative gains, and all components of P within an unknown, complex, multiplicative factor. Assuming that this multiplicative quantity is the absolute gain of the first transmitter-receiver combination, where ($\lambda_2$, $\lambda_3$) are the relative gains of the second and third coil combinations with respect to the first transmitter-receiver combination, the system may be expressed as shown in Equations (20):

$$\begin{cases} V_{T1,R}(\theta_1) = \overline{\overline{F}}(\theta_1) \cdot \overline{\overline{C}}_{T1,R} \cdot \overline{P} \\ V_{T2,R}(\theta_2) = \lambda_2 \overline{\overline{F}}(\theta_2) \cdot \overline{\overline{C}}_{T2,R} \cdot \overline{P} \\ V_{T3,R}(\theta_3) = \lambda_3 \overline{\overline{F}}(\theta_3) \cdot \overline{\overline{C}}_{T3,R} \cdot \overline{P} \end{cases} \quad (EQ.\ 20)$$

where $\theta_j$ is the set of angles at which the measurements for transmitter-receiver j are recorded and used. The directions of the transmitters are not the same, and as shown in Equation (16), the C matrices would be different.

$(\overline{U}_1, \overline{U}_2, \overline{U}_3)$ are defined as three vectors, such that:

$$\begin{bmatrix} \overline{U}_1 \\ \overline{U}_2/\lambda_2 \\ \overline{U}_3/\lambda_3 \end{bmatrix} = \begin{bmatrix} \overline{\overline{C}}_{T1,R} \\ \overline{\overline{C}}_{T2,R} \\ \overline{\overline{C}}_{T3,R} \end{bmatrix} * \overline{P} = \overline{\overline{B}} * \overline{P} \quad (EQ.\ 21)$$

where $\overline{U}_1$ equals $\overline{\overline{F}}^{-1}(\theta_1) V_{T1,R}(\theta_1)$, and the other $\overline{U}_i$ are related similarly.

As mentioned above, C is a (5×9) matrix. As a result, B would be a super matrix of (3×(5×9)) with a rank of 9. It follows that the kernel of B has six independent basis vectors (3×5−9). Those can be computed analytically, simply by Gaussian elimination or preferably by applying a symbolic singular value decomposition (SVD) (QR factorization and bi-diagonalization) to get in both cases closed form expressions of the kernel basis. Nevertheless, it is sufficient to apply a numerical SVD on C and this will lead to exactly the same gains estimates as if closed form expressions are used. This computation has to be done once, as it only depends on the layout of the tool. If SVD is chosen, one may note that the last six rows of the 15*15 unitary matrix created span the desired kernel. These vectors could also be computed using eigenvalue decomposition of matrix B.

Let T be the matrix of size (6×15) composed of kernel basis vectors. Then, regardless of the value of P, T may be expressed as:

$$\overline{\overline{T}} \begin{bmatrix} \overline{U}_1 \\ \overline{U}_2/\lambda_2 \\ \overline{U}_3/\lambda_3 \end{bmatrix} = 0 \quad (EQ.\ 22)$$

T may be re-written in terms of unknown gains only:

$$\overline{\overline{T}} \begin{bmatrix} \overline{U}_1 \\ \overline{U}_2/\lambda_2 \\ \overline{U}_3/\lambda_3 \end{bmatrix} = \overline{\overline{Q}} \cdot \begin{bmatrix} 1 \\ 1/\lambda_2 \\ 1/\lambda_3 \end{bmatrix} = 0 \quad (EQ.\ 23)$$

The system of Equation (23) is linear in $(1/\lambda_2, 1/\lambda_3)$ and can be solved in the least square sense leading to an unbiased estimate of the gains. The system will have a solution if the rank of the resulting matrix is 2. Moreover, the equations involved in this linear system are relations between DC components and second harmonics of Equation (6). If there is no second harmonic, the rank of Q will be less than 2. This is the case when, for example, the M(θ) matrix is diagonal with the same value for (xx) and (yy), corresponding to a homogeneous formation. Although this situation would be rare, the accuracy of the gain estimation will degenerate when the M(θ) matrix is close to being diagonal. In order to estimate gains in these cases, a second receiver 50 may be added close to the first receiver 45. The ratios of the DC components measured by this second receiver 50 will be estimates of ($\lambda_2$, $\lambda_3$)

After gains are estimated, they can be substituted into Equation (21) to compute P by solving the system:

$$\begin{bmatrix} \overline{\overline{C}}_{T1,R} \\ \overline{\overline{C}}_{T2,R} \\ \overline{\overline{C}}_{T3,R} \end{bmatrix} * \overline{P} = \begin{bmatrix} \overline{U}_1 \\ \overline{U}_2/\lambda_2 \\ \overline{U}_3/\lambda_3 \end{bmatrix} \quad (EQ.\ 24)$$

The resulting P components are gain corrected if the gain of the T1-R antenna combination (e.g., coil 35a and coil 45) is assumed equal to unity. To the extent that this gain is a scalar, complex quantity, the components of the coupling tensor have been derived within a constant multiplicative factor. If the actual gain of the first transmitter is known, then $\lambda_2$ and $\lambda_3$ can be used to estimate the actual gains of the other transmitters. In this case, the constant multiplicative factor is known.

The components of P, obtained above, are useful for estimating several properties, including vertical conductivity, horizontal conductivity, anisotropy, bed boundary locations, and orientation. However, it is possible to construct some combination of these parameters that are well-behaved and can be used as indicators without resorting to the inversion process. Symmetrized and anti-symmetrized combinations may be used, for example, for the operation of tool 10 and provide significant benefits for geosteering.

In accordance with the system and method of the present invention, all components of the Z matrix may be determined, making it possible to create any combination of elementary couplings. However, because the parameters are known within a multiplicative factor, it is advantageous to combine them in such a way that the multiplicative factor cancels out. The following relation, for example, uses a general linear combination of products of elementary components, $Z_{ij}$, to some power $p_{ij}$, to construct a combined parameter, V, shown in Equation (25).

$$V = \frac{\sum w_k \prod (Z_{i,j})^{p_{i,j}}}{\sum w_k' \prod (Z_{i,j})^{p'_{i,j}}} \quad (EQ.\ 25)$$

where $\Sigma p_{i,j} = \Sigma p_{i,j}' = n$.

The constants, w, are weighting coefficients. The total power, n, to which the elementary components are raised is the same for the numerator and the denominator, guaranteeing that the multiplicative gain factor cancels out.

As an example of the application of Equation (25), the following combined parameters, $V_1$ and $V_2$ are shown. For n=1:

$$V_1 = \frac{(xz) - (zx)}{(xx)}; \text{ and for } n = 2 \quad (EQ.\ 25a)$$

-continued $$V_2 = \frac{(xx)(yy) - (xy)(yx)}{[(xx) + (yy) + (zz)]^2}.\quad \text{(EQ. 25b)}$$

It should be clear to one of ordinary skill in the relevant arts, that any other combination of the elementary components, and any powers of them, can be used.

Figure 2:
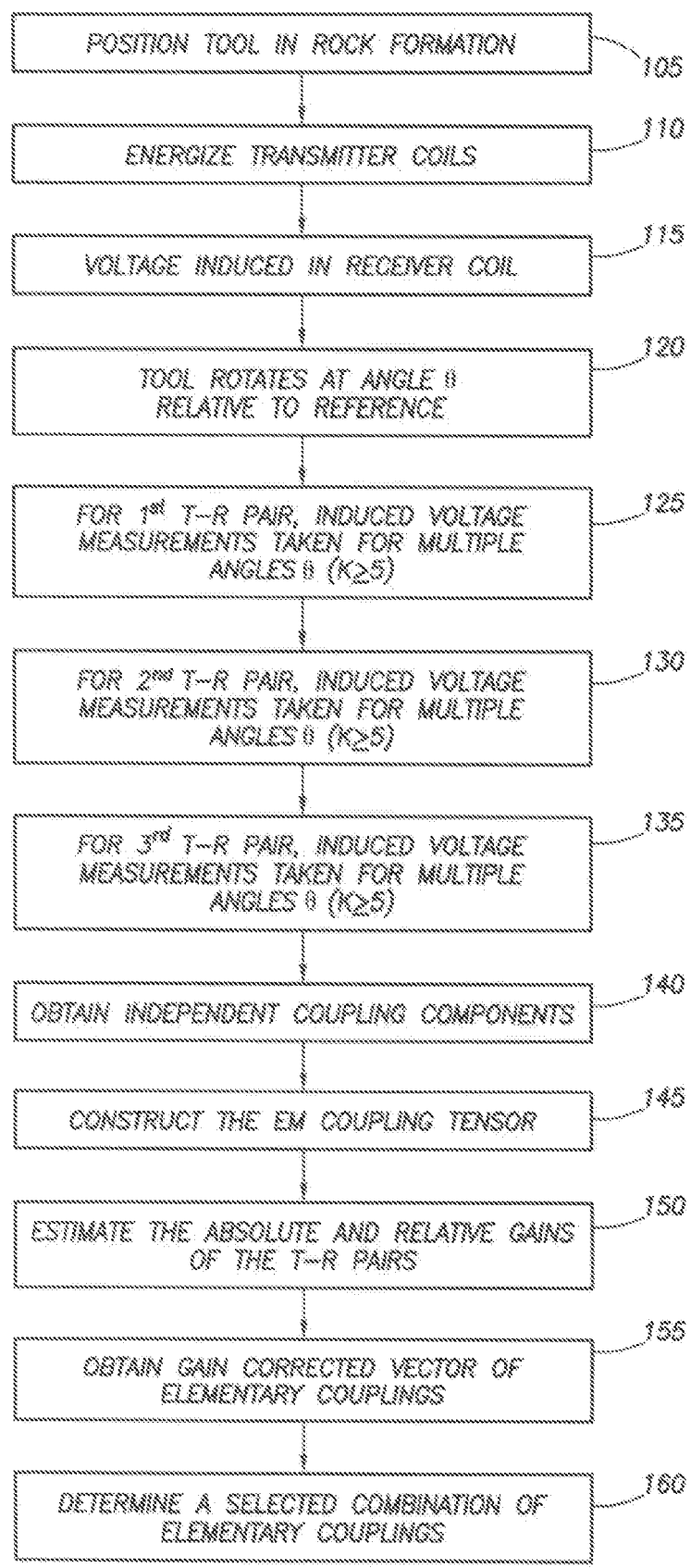
FIG. 2 is a flow diagram of an embodiment determining the gain-corrected components of a coupling tensor in accordance with the present invention.

FIG. 2 shows a flow diagram illustrating a method of the present invention for measuring electromagnetic coupling between two tool subsystems, each equipped with coils, generally denoted by the numeral 100. At step 105, the logging tool is placed down a wellbore in a selected portion of the formation. As discussed above, in connection with FIG. 1, the logging tool contains two subs. The first sub, e.g., a transmitter sub, contains at least three coils. The second sub, e.g., the receiver sub, contains at least one coil that is not aligned with the tool axis. At step 110, the coils in the transmitter sub are energized. In response, voltage is induced in the receiver coils at step 115. The logging tool rotates about the tool axis in the wellbore as it takes measurements of the formation, as shown in step 120. As discussed above, the tool rotates at angle θ relative to a selected reference point.

At step 125, for the first transmitter-receiver pair, measurements are taken of the voltage induced in the receiver coil as a result of the current flowing in the first transmitter coil for k different angles, where k is greater than or equal to 5. As shown in steps 130 and 135, these measurements are repeated for the second and third transmitter-receiver pairs. Accordingly, measurements of the voltage induced in the receiver coil as a result of the current flowing in the second transmitter coil for at least five different angles are made as the tool rotates. Similarly, the tool takes measurements of the voltage induced in the receiver coil as a result of the current flowing in the third transmitter coil for at least five different angles.

At step 140, all of the independent components of the coupling tensor are obtained. Next, at step 145, the coupling tensor is constructed. This complete measurement allows for the determination of earth conductivity anisotropy and the distance to boundaries separating media of different conductivities, among other electrical properties of the formation.

Although the coupling tensor constructed in step 145 can be used in certain applications, it is desirable to have a more accurate gain-corrected coupling tensor. At step 150, the absolute gain for the first transmitter-receiver combination is obtained, as well as the relative gains of the second and third coil combinations with respect to the first transmitter-receiver combination. Next, at step 155, the gain-corrected components of the vector of elementary couplings, i.e., the P components, are obtained. The process for doing this is shown in Equations (20)-(24), discussed above. Although these gain-corrected components are useful for determining a number of formation properties, it is also desirable to construct a combination of elementary couplings, as shown in step 160.

In another embodiment, a method for obtaining a gain-corrected electromagnetic coupling tensor with closed form solutions is provided. The closed form solution can be used with three transmitters and one receiver, as described above.

An example of the method is now described in relation to a gain-corrected electromagnetic coupling tensor with three transmitters and one receiver. The voltage induced at a receiver by an electromagnetic field transmitted from a transmitter is given by Equation (5c) as shown above. Substituting Equation (6) into Equation (5c), we obtain Equation (26) which shows the voltage can be expressed in terms of a Fourier series of azimuth angle up to the second order.

$$V_{TR}(\phi) = C_0 + C_{1c}\cos(\phi) + C_{1s}\sin(\phi) + C_{2c}\cos(2\phi) + C_{2s}\sin(2\phi); \quad \text{(EQ. 26)}$$

where $\phi$ is the azimuth angle of the receiver, and we have defined a set of complex coefficients $C_0$, $C_{1c}$, $C_{1s}$, $C_{2c}$, and $C_{2s}$ to represent the $0^{th}$, $1^{st}$, and $2^{nd}$ harmonics coefficients of the voltage:

$$C_0 = \left[ zz\cos(\theta_R)\cos(\theta_T) + \frac{1}{2}(xx+yy)\sin(\theta_R)\sin(\theta_T)\cos(\phi_T) + \frac{1}{2}(xy-yx)\sin(\theta_R)\sin(\theta_T)\sin(\phi_T) \right]; \quad \text{(EQ. 27a)}$$

$$C_{1c} = [xz\sin(\theta_R)\cos(\theta_T) + zx\cos(\theta_R)\sin(\theta_T)\cos(\phi_T) + zy\cos(\theta_R)\sin(\theta_T)\sin(\phi_T)]; \quad \text{(EQ. 27b)}$$

$$C_{1s} = [yz\sin(\theta_R)\cos(\theta_T) + zy\cos(\theta_R)\sin(\theta_T)\cos(\phi_T) - zx\cos(\theta_R)\sin(\theta_T)\sin(\phi_T)]; \quad \text{(EQ. 27c)}$$

$$C_{2c} = \left[ \frac{1}{2}(xx-yy)\sin(\theta_R)\sin(\theta_T)\cos(\phi_T) + \frac{1}{2}(xy+yx)\sin(\theta_R)\sin(\theta_T)\sin(\phi_T) \right]; \quad \text{(EQ. 27d)}$$

$$C_{2s} = \left[ \frac{1}{2}(xy-yx)\sin(\theta_R)\sin(\theta_T)\cos(\phi_T) - \frac{1}{2}(xx+yy)\sin(\theta_R)\sin(\theta_T)\sin(\phi_T) \right]; \quad \text{(EQ. 27e)}$$

where $\theta_R$ and $\theta_T$ are the receiver and transmitter angles with respect to the tool axis, and $\phi_T$ is the azimuth angle of the transmitter relative to the receiver.

The $0^{th}$ harmonic coefficient depends on the couplings zz, (xx+yy), and (xy−yx). The two $1^{st}$ harmonic coefficients depend on the couplings xz, zx, yz, and zy; and the two $2^{nd}$ harmonic coefficients depend on (xx−yy) and (xy+yx). The harmonic coefficients can be divided into groups based on their coupling components: Group 1 includes the $0^{th}$ harmonic coefficient; Group 2 includes the $1^{st}$ harmonic coefficients; and Group 3 includes the $2^{nd}$ harmonic coefficients. (FIG. 3, step 310).

Figure 3:
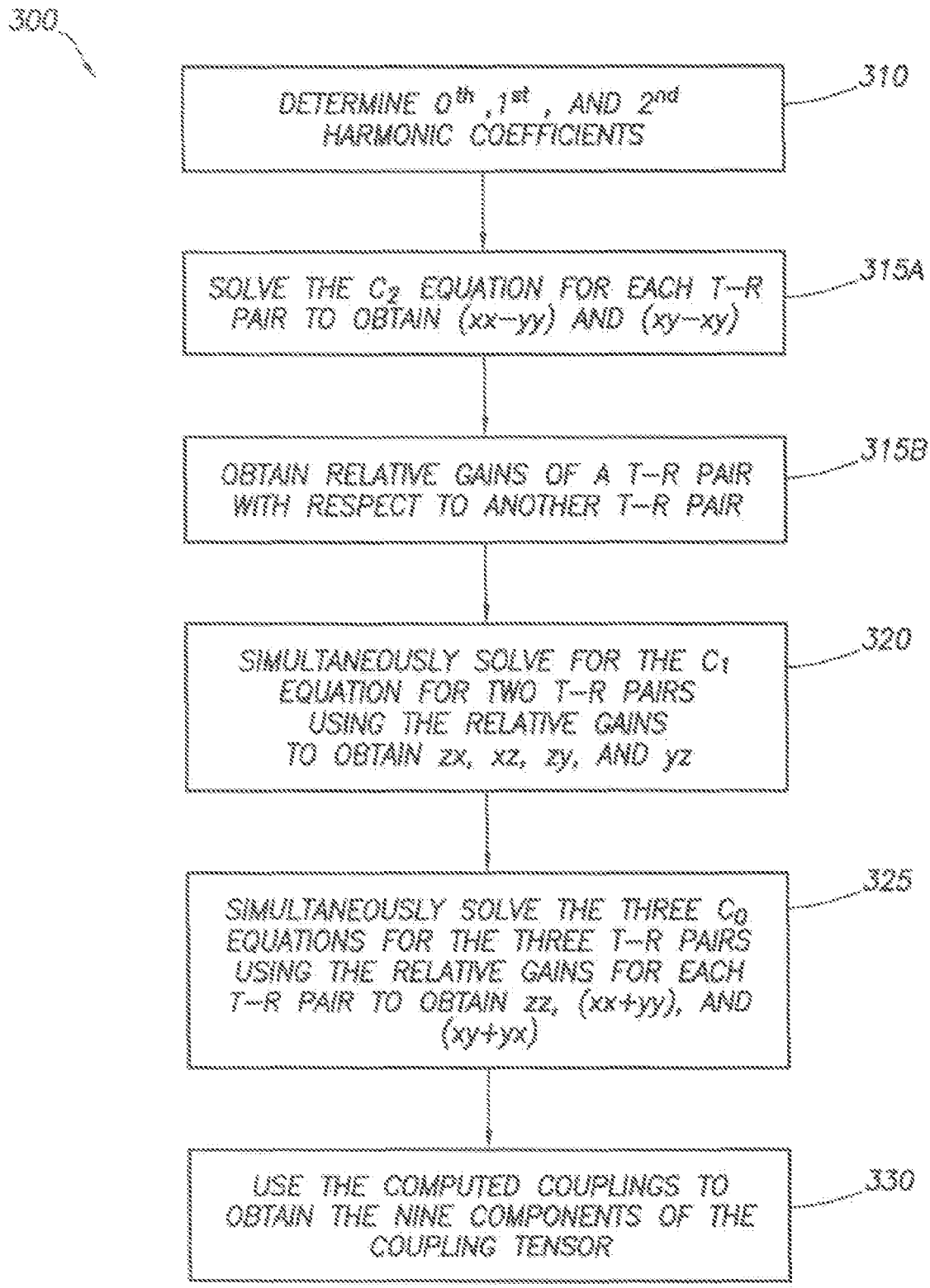
FIG. 3 is a flow diagram of another embodiment determining the gain-corrected components of a coupling tensor in accordance with the present invention.

In step 315A of FIG. 3, the coupling components are determined from the $2^{nd}$ harmonic coefficients:

$$(xx-yy) = [C_{2c}\cos(\phi_T) - C_{2s}\sin(\phi_T)]/\sin(\theta_R)\sin(\theta_T); \quad \text{(EQ. 28)}$$

$$(xy-yx) = [C_{2c}\sin(\phi_T) + C_{2s}\cos(\phi_T)]/\sin(\theta_R)\sin(\theta_T). \quad \text{(EQ. 29)}$$

In the above equations, the superscript i=1, 2, and 3 refers to the first, second, and third T-R pairs, respectively.

In step 315B, the relative gain of the second T-R pair with respect to the first T-R pair can be calculated based on the ratio of (xx−yy) or (xy−yx) from the corresponding equations for those T-R pairs:

$$g_2 = \frac{(xx^{(2)} - yy^{(2)})}{(xx^{(1)} - yy^{(1)})} \quad \text{(EQ. 30a)}$$

$$= \frac{[C_{2c}^{(2)}\cos(\phi_T^{(2)}) - C_{2s}^{(2)}\sin(\phi_T^{(2)})]\sin(\theta_T^{(1)})}{[C_{2c}^{(1)}\cos(\phi_T^{(1)}) - C_{2s}^{(1)}\sin(\phi_T^{(1)})]\sin(\theta_T^{(2)})};$$

or

-continued $$g_2 = \frac{(xy^{(2)} - yx^{(2)})}{(xy^{(1)} - yx^{(1)})} \quad \text{(EQ. 30b)}$$

$$= \frac{[C_{2c}^{(2)}\sin(\phi_T^{(2)}) + C_{2s}^{(2)}\cos(\phi_T^{(2)})]\sin(\theta_T^{(1)})}{[C_{2c}^{(1)}\sin(\phi_T^{(1)}) + C_{2s}^{(1)}\cos(\phi_T^{(1)})]\sin(\theta_T^{(2)})};$$

An average or weighted average from the two calculated relative gain values may be used to get a more accurate relative gain.

Similarly, the relative gain for the third T-R pair with respect to the first T-R pair can be calculated as:

$$g_3 = \frac{(xx^{(3)} - yy^{(3)})}{(xx^{(1)} - yy^{(1)})} \quad \text{(EQ. 30c)}$$

$$= \frac{[C_{2c}^{(3)}\cos(\phi_T^{(3)}) - C_{2s}^{(3)}\sin(\phi_T^{(3)})]\sin(\theta_T^{(1)})}{[C_{2c}^{(1)}\cos(\phi_T^{(1)}) - C_{2s}^{(1)}\sin(\phi_T^{(1)})]\sin(\theta_T^{(3)})};$$

or $$g_3 = \frac{(xy^{(3)} - yx^{(3)})}{(xy^{(1)} - yx^{(1)})} \quad \text{(EQ. 30d)}$$

$$= \frac{[C_{2c}^{(3)}\sin(\phi_T^{(3)}) - C_{2s}^{(3)}\cos(\phi_T^{(3)})]\sin(\theta_T^{(1)})}{[C_{2c}^{(1)}\sin(\phi_T^{(1)}) - C_{2c}^{(1)}\cos(\phi_T^{(1)})]\sin(\theta_T^{(3)})}.$$

Note that the form of equations (30) comply with the more general result of equation (24), but only exhibiting 4 equations instead of 6.

In step 320, the equations for the $1^{st}$ harmonic coefficients are used to compute the couplings $xz^{(1)}$, $zx^{(1)}$, $yz^{(1)}$, and $zy^{(1)}$ using any two of the three transmitter-receiver pairs, as follows:

$$zx^{(1)} = \frac{\alpha\gamma_1 + \beta\gamma_2}{\alpha^2 + \beta^2}; \quad \text{(EQ. 31)}$$

$$zy^{(1)} = \frac{\beta\gamma_1 - \alpha\gamma_2}{\alpha^2 + \beta^2}; \quad \text{(EQ. 32)}$$

$$xz^{(1)} = \frac{C_{1s}^{(1)} - zx^{(1)}\cos(\theta_R)\sin(\theta_T^{(1)})\cos(\phi_T^{(1)}) - zy^{(1)}\cos(\theta_R)\sin(\theta_T^{(1)})\sin(\phi_T^{(1)})}{\sin(\theta_R)\cos(\theta_T^{(1)})}; \quad \text{(EQ. 33)}$$

$$yz^{(1)} = \frac{C_{1c}^{(1)} - zy^{(1)}\cos(\theta_R)\sin(\theta_T^{(1)})\cos(\phi_T^{(1)}) + zx^{(1)}\cos(\theta_R)\sin(\theta_T^{(1)})\sin(\phi_T^{(1)})}{\sin(\theta_R)\cos(\theta_T^{(1)})}; \quad \text{(EQ. 34)}$$

where $\alpha$, $\beta$, $\gamma_1$, and $\gamma_2$ are defined as:

$$\alpha = \cos(\theta_R)[\sin(\theta_T^{(1)})\cos(\theta_T^{(2)})\sin(\phi_T^{(1)}) - \sin(\theta_T^{(2)})\cos(\theta_T^{(1)})\sin(\phi_T^{(2)})]; \quad \text{(EQ. 35a)}$$

$$\beta = \cos(\theta_R)[\sin(\theta_T^{(2)})\cos(\theta_T^{(1)})\sin(\phi_T^{(2)}) - \sin(\theta_T^{(1)})\cos(\theta_T^{(2)})\sin(\phi_T^{(1)})]; \quad \text{(EQ. 35b)}$$

$$\gamma_1 = C_{1c}^{(1)}\cos(\theta_T^{(2)}) - C_{1c}^{(2)}\cos(\theta_T^{(1)})g_2; \quad \text{(EQ. 35c)}$$

$$\gamma_2 = C_{1s}^{(1)}\cos(\theta_T^{(2)}) - C_{1s}^{(2)}\cos(\theta_T^{(1)})/g_2; \quad \text{(EQ. 35d)}$$

if the first and second T-R pairs are used, and $$\alpha = \cos(\theta_R)[\sin(\theta_T^{(1)})\cos(\theta_T^{(3)})\sin(\phi_T^{(1)}) - \sin(\theta_T^{(3)})\cos(\theta_T^{(1)})\sin(\phi_T^{(3)})]; \quad \text{(EQ. 36a)}$$

$$\beta = \cos(\theta_R)[\sin(\theta_T^{(3)})\cos(\theta_T^{(1)})\sin(\phi_T^{(3)}) - \sin(\theta_T^{(1)})\cos(\theta_T^{(3)})\sin(\phi_T^{(1)})]; \quad \text{(EQ. 36b)}$$

$$\gamma_1 = C_{1c}^{(1)}\cos(\theta_T^{(3)}) - C_{1c}^{(3)}\cos(\theta_T^{(1)})/g_3; \quad \text{(EQ. 36c)}$$

$$\gamma_2 = C_{1s}^{(1)}\cos(\theta_T^{(3)}) - C_{1s}^{(3)}\cos(\theta_T^{(1)})/g_3; \quad \text{(EQ. 36d)}$$

if the first and third T-R pairs are used.

An average or weighted average of the two calculated sets of values for xz, zx, yz, and zy may be computed to get more accurate results.

In step 325, using a similar approach, the three $C_0$ equations for the three T-R pairs are solved simultaneously using the relative gains for each T-R pair. This leads to:

$$(xx + yy) = \frac{a_{22}\lambda_1 - a_{12}\lambda_2}{a_{11}a_{22} - a_{12}a_{21}}; \quad \text{(EQ. 37)}$$

$$(xy + yx) = \frac{a_{21}\lambda_1 - a_{11}\lambda_2}{a_{11}a_{22} - a_{12}a_{21}}; \quad \text{(EQ. 38)}$$

$$zz = \frac{C_0^{(1)} - \frac{1}{2}(xx + yy)\sin(\theta_R)\sin(\theta_T^{(1)})\cos(\phi_T^{(1)}) - \frac{1}{2}(xy - yx)\sin(\theta_R)\sin(\theta_T^{(1)})\sin(\phi_T^{(1)})}{\cos(\theta_R)\cos(\theta_T^{(1)})}; \quad \text{(EQ. 39)}$$

where $a_{11}$, $a_{12}$, $a_{21}$, $a_{22}$, $\lambda_1$ and $\lambda_2$ are defined as:

$$a_{11} = \frac{1}{2}\sin(\theta_R)[\sin(\theta_T^{(1)})\cos(\theta_T^{(2)})\cos(\phi_T^{(1)}) - \sin(\theta_T^{(2)})\cos(\theta_T^{(1)})\cos(\phi_T^{(2)})]; \quad \text{(EQ. 40a)}$$

$$a_{12} = \frac{1}{2}\sin(\theta_R)[\sin(\theta_T^{(1)})\cos(\theta_T^{(2)})\sin(\phi_T^{(1)}) - \sin(\theta_T^{(2)})\cos(\theta_T^{(1)})\sin(\phi_T^{(2)})]; \quad \text{(EQ. 40b)}$$

$$a_{21} = \frac{1}{2}\sin(\theta_R)[\sin(\theta_T^{(1)})\cos(\theta_T^{(3)})\cos(\phi_T^{(1)}) - \sin(\theta_T^{(3)})\cos(\theta_T^{(1)})\cos(\phi_T^{(3)})]; \quad \text{(EQ. 40c)}$$

$$a_{22} = \frac{1}{2}\sin(\theta_R)[\sin(\theta_T^{(1)})\cos(\theta_T^{(3)})\sin(\phi_T^{(1)}) - \sin(\theta_T^{(3)})\cos(\theta_T^{(1)})\sin(\phi_T^{(3)})]; \quad \text{(EQ. 40d)}$$

$$\lambda_1 = C_0^{(1)}\cos(\theta_T^{(2)}) - C_0^{(2)}\cos(\theta_T^{(1)})/g_2; \quad \text{(EQ. 40e)}$$

$$\lambda_2 = C_0^{(1)}\cos(\theta_T^{(3)}) - C_0^{(3)}\cos(\theta_T^{(1)})/g_3. \quad \text{(EQ. 40f)}$$

Using the couplings $zz^{(1)}$, $(xx^{(1)}+yy^{(1)})$, $(xy^{(1)}-yx^{(1)})$, $xz^{(1)}$, $zx^{(1)}$, $zy^{(1)}$, $yz^{(1)}$, $(xx^{(1)}-yy^{(1)})$ and $(xy^{(1)}+yx^{(1)})$, the nine components of the coupling tensor for the first T-R pair may be obtained. The nine components of the coupling tensor for the second and the third T-R pairs may be obtained from those for the first T-R pair by multiplying the gain factors $g_2$ and $g_3$, respectively, from Eq. 30 (step 330).

From the foregoing detailed description of specific embodiments of the invention, it should be apparent that a novel system and method to determine the electromagnetic coupling tensor of an earth formation has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the scope of the invention as defined by the appended claims.

What is claimed is:

1. A method to determine earth formation properties, the method comprising:
    positioning a logging tool within a wellbore in the earth formation, the logging tool having a tool rotation axis and a first, a second, and a third tilted transmitter coil, and a tilted receiver coil;
    rotating the logging tool about the tool rotation axis;
    energizing each transmitter coil;
    measuring a coupling signal between each transmitter coil and the receiver coil for a plurality of angles of rotation;
    determining a coupling tensor; and
    determining the earth formation properties using the coupling tensor.

2. The method of claim 1, wherein the transmitters and receiver operate in a reciprocal manner.

3. The method of claim 1, wherein the transmitter coils are energized one at a time.

4. The method of claim 1, wherein the plurality of angles of rotation comprises at least five angles.

5. The method of claim 1, wherein the coupling tensor is gain-corrected.

6. The method of claim 5, wherein the gain-corrected coupling tensor uses relative gains.

7. The method of claim 6, wherein the logging tool further comprises a second receiver coil and the determining the coupling tensor further comprises using the second receiver coil to determine the relative gains.

8. The method of claim 6, wherein the actual gain of the first transmitter coil is known, and the relative gains are used to estimate the actual gains of the other transmitter coils.

9. The method of claim 1, wherein determining the earth formation properties comprises combining components of the coupling tensor.

10. The method of claim 1, wherein determining the earth formation properties comprises determining a conductivity tensor.

11. The method of claim 1, wherein the determining a coupling tensor comprises using a singular value decomposition.

12. The method of claim 1, wherein the determining a coupling tensor comprises using a closed-form solution.

13. The method of claim 1, wherein the transmitter coils operate simultaneously at slightly different frequencies.

14. A system used in a wellbore to determine earth formation properties, the system comprising:
    a logging tool disposed within the wellbore, the logging tool rotating about a tool rotation axis;
    a first, a second, and a third tilted transmitter coil disposed on the logging tool;
    a tilted receiver coil disposed on the logging tool;
    voltage-measuring circuitry disposed on the logging tool; and
    a processor to determine the electromagnetic coupling tensor and the earth formation properties using the coupling tensor.

15. The system of claim 14, wherein the transmitters and receiver operate in a reciprocal manner.

16. The system of claim 14, wherein the transmitter coils are energized one at a time.

17. The system of claim 14, wherein the transmitter coils operate simultaneously at slightly different frequencies.

18. The system of claim 14, wherein the transmitter coils are azimuthally rotated relative to one another.

19. The system of claim 14, wherein the voltage-measuring circuitry makes at least five measurements at different angles of tool rotation.

20. The system of claim 14, wherein the coupling tensor is gain-corrected.

21. The system of claim 20, wherein the gain-corrected coupling tensor uses relative gains.

22. The system of claim 21, wherein the logging tool further comprises a second receiver coil.

23. The system of claim 14, wherein the processor combines components of the coupling tensor.

24. The system of claim 23, wherein the coupling tensor is gain-corrected, the gain-corrected coupling tensor uses relative gains, and the relative gains cancel in the combined components.

25. The system of claim 14, wherein the earth formation properties comprise a conductivity tensor.

26. The method of claim 1, wherein the determining a coupling tensor comprises using a Gaussian elimination.

27. The method of claim 1, wherein the determining a coupling tensor comprises using a eigenvalue decomposition.

* * * * *